US006935120B2

(12) United States Patent
Adibhatla

(10) Patent No.: US 6,935,120 B2
(45) Date of Patent: Aug. 30, 2005

(54) APPROACH TO EXTENDING LIFE OF GAS TURBINE ENGINE

(75) Inventor: Sridhar Adibhatla, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/142,240

(22) Filed: May 9, 2002

(65) Prior Publication Data

US 2005/0086942 A1 Apr. 28, 2005

(51) Int. Cl.[7] .............................................. F02C 7/12
(52) U.S. Cl. ...................................................... 60/782
(58) Field of Search .......................... 60/204, 243, 272, 60/773, 782, 785; 415/115

(56) References Cited

U.S. PATENT DOCUMENTS

| | | | |
|---|---|---|---|
| 3,751,909 A | * 8/1973 | Kohler ....................... | 415/115 |
| 3,784,130 A | 1/1974 | Robinson | |
| 4,010,605 A | 3/1977 | Uram | |
| 4,767,259 A | * 8/1988 | Kurosawa et al. ............ | 60/782 |
| 4,856,272 A | * 8/1989 | Putman et al. ................ | 60/782 |
| 5,081,830 A | * 1/1992 | Schwarz et al. .............. | 60/782 |
| 5,622,045 A | * 4/1997 | Weimer et al. ............... | 60/204 |
| 5,887,419 A | * 3/1999 | Rowe et al. .................. | 60/243 |
| 6,164,902 A | 12/2000 | Irwin et al. | |
| 6,625,987 B2 | * 9/2003 | Pisano et al. ................. | 60/773 |

\* cited by examiner

*Primary Examiner*—Michael Koczo, Jr.
(74) *Attorney, Agent, or Firm*—William Scott Andes; Gregory Welte

(57) ABSTRACT

Methods of increasing lifetimes of components in a gas turbine engine. Ordinarily, components are replaced after they experience a certain number of thermal cycles, or a certain operating temperature limit is exceeded. Under one form of the invention, the components are not replaced at that time, but are subjected to increased cooling, which decreases the highest temperature reached in subsequent thermal cycles. Also, many components are replaced when acceleration of an engine falls below a target. In one form of the invention, the components are not replaced, but (1) scheduled fuel flow is increased and (2) compressor stall margin also increased, in order to attain the target acceleration.

6 Claims, 4 Drawing Sheets

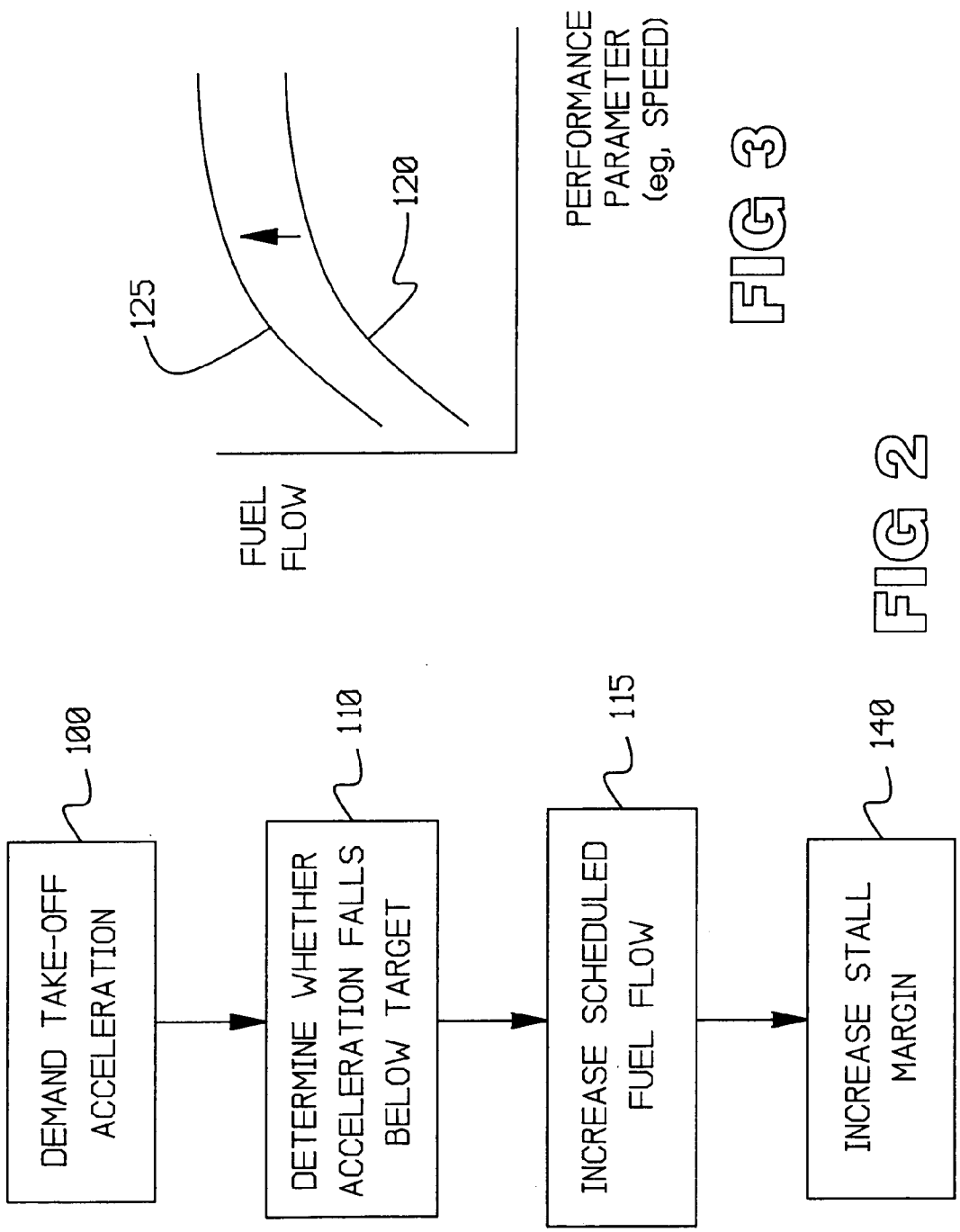

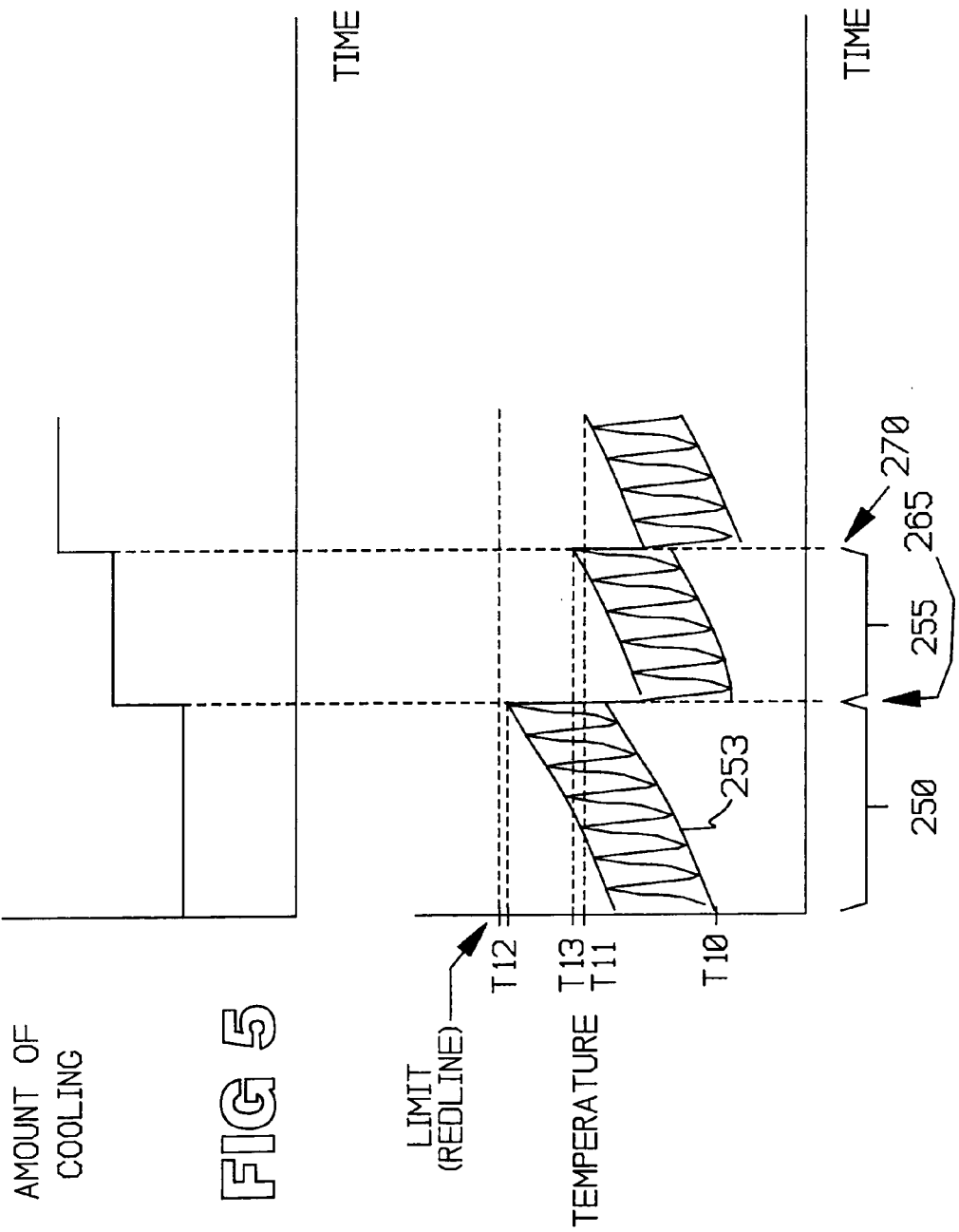

APPROACH TO EXTENDING LIFE OF GAS TURBINE ENGINE

TECHNICAL FIELD

The invention relates to gas turbine engines and, particularly, to control systems used in such engines.

BACKGROUND OF THE INVENTION

Components in gas turbine engines are normally replaced when their useful lifetimes are reached. Of course, if damage occurs to a component, that component will be replaced earlier.

However, in some cases, the lifetimes of components are measured not by the structural viability of the components, but by other factors. Such components are replaced, even though they are structurally sound and could remain in service.

For example, if the acceleration of an engine falls below a target, a type of overhaul is undertaken, wherein numerous components are replaced. However, in many instances, the slowly accelerating engine is perfectly sound, and contains sound components. The engine merely suffers from slow acceleration, and the overhaul and component replacement are undertaken for that reason.

As another example, some components are replaced after they have experienced a certain amount of thermal cycling, or have been exposed to high temperatures for certain lengths of time. However, these components are not necessarily faulty.

The invention has developed an approach to increasing lifetimes of certain components in gas turbine engines.

SUMMARY OF THE INVENTION

In one form of the invention, a particular type of acceleration is demanded of a gas turbine engine. If the engine's rate of acceleration fails to meet a target, then both (1) scheduled fuel flow and (2) compressor stall margin are increased for subsequent accelerations, thereby causing the acceleration to reach the target.

In another form of the invention, after a component has experienced a specified number of thermal cycles, cooling to the component is increased.

BRIEF DESCRIPTION OF THE DRAWINGS

FIG. 2 is a flow chart illustrating processes implemented by one form of the invention.

FIG. 3 illustrates symbolically an increase in scheduled fuel flow, and is not drawn to scale.

FIG. 5 is a flow chart of the type shown in FIG. 4, but representing a different time-temperature pattern.

DETAILED DESCRIPTION OF THE INVENTION

Figure 1:
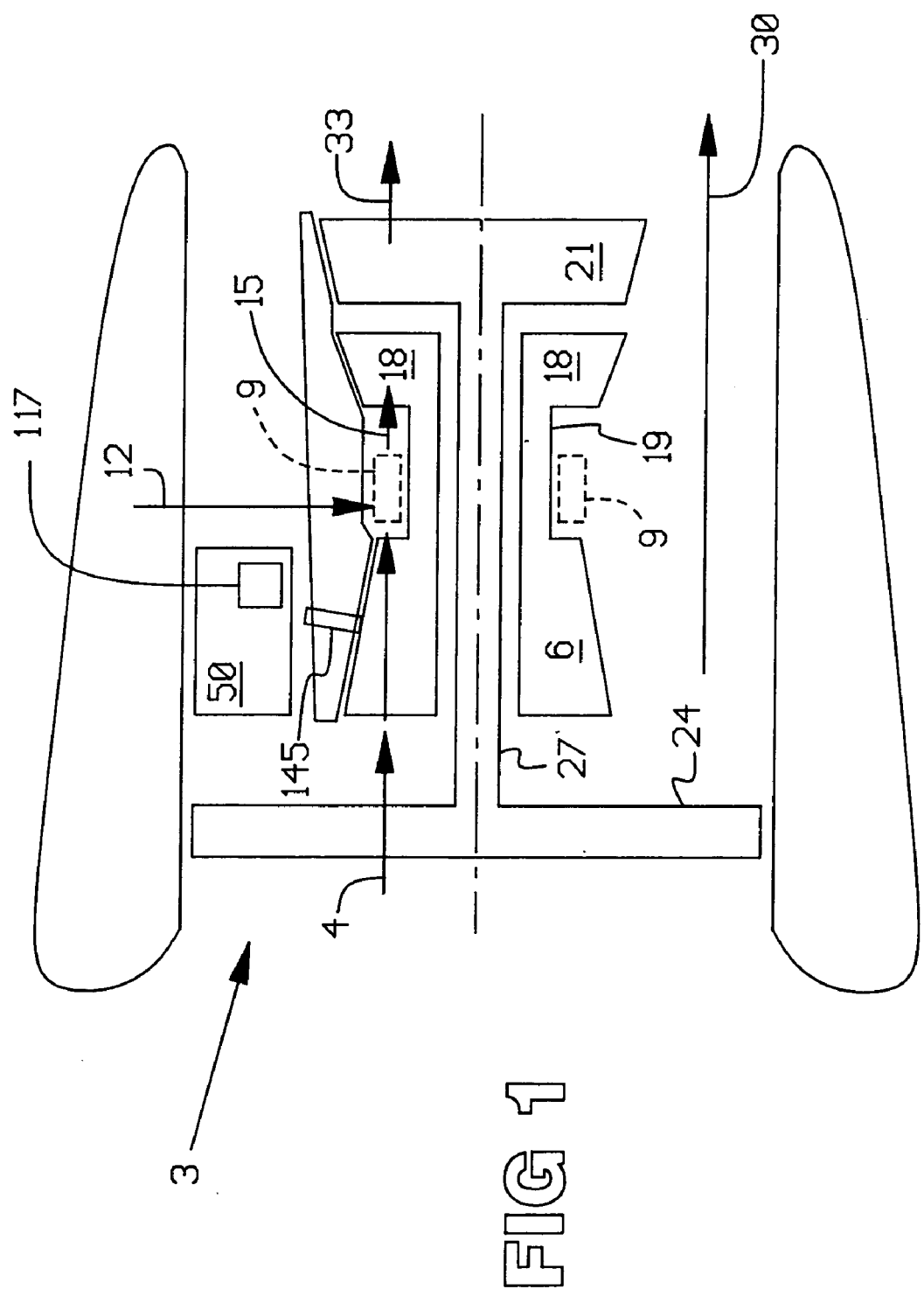
FIG. 1 is a simplified schematic of a generalized gas turbine engine. Block 117 indicates hardware and software which implement various features of the invention.

FIG. 1 is a simplified schematic of a gas turbine engine 3. Incoming air 4 is compressed by a compressor 6, and the compressed air is delivered to a combustor 9. Fuel 12 is injected into the combustor 9, and is burned.

The hot combustion products 15 are delivered to a high-pressure turbine 18, which extracts energy from the combustion products 15. That energy is returned to the compressor 6, by way of shaft 19, for compressing further incoming air. The combustion products 15, now somewhat cooled, are delivered to a low-pressure turbine 21, which extracts further energy, and delivers the energy to a fan 24, by way of shaft 27. The fan 24 provides thrust indicated by arrow 30. Gases leaving the low-pressure turbine 21 also provide thrust indicated by arrow 33.

A simplified description of a twin spool turbofan engine has been given. It is emphasized that the invention is not limited to that particular type of engine, but is applicable to gas turbine engines generally.

In actual use, an operator (not shown) of the engine 3 will demand that the engine undertake an acceleration. A control system 50 handles the acceleration. The control system 50 is ordinarily attached to a casing of the engine 3, but is shown as displaced from the engine 3, to avoid clutter.

It is noted that executing the acceleration is not a simple matter of increasing the rate of delivery of fuel 12 to the combustor 9. Rather, the delivery of fuel 12 is scheduled by the control system 50, and the schedule is adjusted in an upward direction.

Scheduling is a term-of-art. Scheduling refers to the fact that the amount of fuel delivered, in pounds per second, is progressively changed as various measured parameters in the engine change during the acceleration. In addition, the control system 50 may adjust other parameters, or structures, within the engine 3 during the acceleration.

For example, inlet guide vanes, not shown but known in the art, adjust the angle of attack of incoming air to the individual blades (not shown) within the compressor 6. As compressor speed increases, as occurs during the acceleration, the control system 50 adjusts the inlet guide vanes to maintain a proper angle of attack.

Thus, the delivery of fuel to the engine 3 during an acceleration is scheduled by the control system 50, and the scheduling may be accompanied by adjustment of certain mechanisms within the engine, such as inlet guide vanes. Scheduling of fuel during an acceleration is known in the art.

As stated in the Background of the Invention, over time, the rate of acceleration of engine 3 can diminish. That is, an engine having 2,000 hours of use may accelerate slower than a new engine. Under one form of the invention, this reduction in acceleration is mitigated by the following stratagems.

First, a determination is made as to whether the acceleration falls below a target. This determination can be made, for example, by demanding take-off acceleration from an engine used in an aircraft. Block 100 in FIG. 2 represents this process. As stated above, control system 50 schedules fuel to the engine during this acceleration.

Next, actual acceleration of the engine is measured. That is, the time required for the rotational speed of the engine to reach full power is measured. Block 105 in FIG. 2 indicates this process.

Next, a determination is made of whether the acceleration meets a target. Block 110 in FIG. 2 indicates this process. The determination can inquire, for example, whether full speed was reached in a specified number of seconds. The value of full speed, in rpm, as well as the number of seconds required to reach that value will vary, depending on engine type.

Next, if the acceleration failed to meet the target, the invention adjusts the fuel schedule, as by increasing the rate of delivery by 5 percent. Block 115 in FIG. 2 indicates this process. Also, plot 125 in FIG. 3 indicates the process graphically. Assume that the engine 3, when new, used the simplified fuel schedule 120 indicated. If the procedures of FIG. 2 indicated that the fuel schedule 120 should be modified, then the schedule 120 can be raised by 5 percent, to schedule 125, as indicated in FIG. 3.

Raising fuel flow, as just described, can decrease stall margin of the compressor 6. Block 140 in FIG. 2 indicates that stall margin is increased, in order to counteract the decrease. One approach to increasing stall margin is to increase compressor bleed. Block 145 in FIG. 1 indicates a compressor bleed. Compressor bleed, by itself, is known in the art, as is its actuation.

When the acceleration terminates, as when full speed has been reached, the compressor bleed is terminated. Other compressor bleeds, unrelated to the invention, may still be maintained.

In a pre-existing engine, the invention can be implemented using existing bleed valves, such as anti-icing valves or transient valves can be opened. In a newly designed engine, dedicated valves for the purpose of block 140 can be implemented.

Therefore, as thus far described, one form of the invention ascertains whether the acceleration of the engine has deteriorated beyond a target value. If so, scheduled fuel flow is incremented upward, and compressor bleed during the acceleration is increased.

In this particular example, acceleration of the engine was actually measured, in order to ascertain whether it meets the required target. In other situations, the acceleration available in the engine can be inferred, or estimated, without actual measurement. For example, a fleet of engines can be monitored, and it may be determined that, after X take-off cycles in the average engine, acceleration deteriorates to the extent that the target is not met. Accordingly, it would be determined that whenever an engine of similar type experiences X take-off cycles, irrespective of actual acceleration performance, the fuel schedule should be adjusted as in block 115 in FIG. 2.

As a more complex example, well-developed computer models of gas turbine engines exist. These models allow computation of behavior of the engine, such as acceleration, from measurement of other parameters. For example, an engine designer knows what particular ensemble of parameters, such as temperatures, pressures, fuel flow, and so on, to measure in an actual engine, in order to allow the computer model to predict the acceleration of that engine.

As a related example, an ensemble of engine parameters can be measured in a fleet of engines. The acceleration of each engine can be measured. A correlation between the parameters and the accelerations can be obtained. This correlation allows one to measure the corresponding ensemble of parameters in an engine of similar type, and thereby predict the acceleration of that engine.

Once a determination is made that a given engine has experienced sufficiently reduced acceleration, the correctives, or corrective measures, of blocks 115 and 140 in FIG. 2 are taken. These correctives can be taken in at least two different ways.

In one approach, a test acceleration is undertaken. Block 117 in FIG. 1 indicates software and hardware which performs the test. If the test indicates that correctives are required, then the fuel schedule is adjusted, as indicated in FIG. 3, and the adjusted fuel schedule is used for future accelerations. Also, the increase in compressor stall margin is undertaken in subsequent accelerations.

Restated, the correctives are not undertaken in the test acceleration. Of course, if the test acceleration takes the form of a computer simulation, or other simulation, the correctives would not be undertaken at that time either, but in future actual accelerations.

In a second approach, the correctives are applied in real-time, as the acceleration is executed. For example, the inquiry of block 110 in FIG. 2 would be undertaken, for example, during the first two seconds of an acceleration. If correctives are deemed necessary, then fuel flow and compressor stall margin are both increased during the remainder of the acceleration.

Once the procedures of FIG. 2 are executed, they may be repeated, to assure that the resulting alteration in fuel flow is sufficient to attain the desired acceleration. If not, in each repetition, the correctives are applied, and the repetitions continue until the desired acceleration is reached.

A limit may be placed on the repetitions. The limit may be measured by (1) number of repetitions, such as five, (2) a maximum limit on fuel, in terms of pounds per hour, or (3) a maximum limit on compressor bleed, in terms of pounds per hour. If the limit is reached, and the desired acceleration has not been reached, then the engine is overhauled, or otherwise serviced, in the usual manner.

A distinction should be made between the process of increasing scheduled fuel flow, and a prior art process which may seem to be related, but is not. As to the latter, a driver of a car may attempt to pass another car. During the passing maneuver, the driver may see that the maneuver needs to be executed more quickly than originally estimated, and will press the accelerator pedal, to attain greater acceleration. That is, the driver (1) sees that existing acceleration is insufficient and (2) increases fuel delivery until a higher acceleration is attained.

However, the two steps undertaken by the driver are not found in the invention. One reason is that the invention increases scheduled fuel flow. That is, actual fuel flow is not under the direct control of the pilot of an aircraft powered by gas turbine engines. There is no true analogy between the accelerator pedal of the previous paragraph and the throttle lever in a jet aircraft.

From another perspective, scheduled fuel flow, in effect, is an equation. It may be represented as Fuel Flow=$AX1+BX2+CX3+DX4$ and so on, wherein fuel flow is measured in pounds per hour; $X1$, $X2$, $X3$, and $X4$ are measured operating parameters of the engine, such as rpm, stator vane angle, and so on; and A, B, C, and D are weights or constants.

One approach to increasing scheduled fuel flow under the invention would, in concept, be to increase the constants A, B, C, and D by the five percent stated above, but only during accelerations.

In another form of the invention, replacement of components in an engine is deferred by another stratagem. Many components are replaced when their thermal history reaches a limit. For example, a cycle is often defined as an excursion from a low temperature $T1$ to a high temperature $T2$. Temperature $T1$ is often taken as a standard nominal ambient temperature, and is the temperature of the component when cold, when the engine is dormant. When the component experiences a given number of cycles, the component is replaced.

Under the invention, the component is not replaced at that time, but increased cooling is applied to the component. One effect of the increased cooling can be to prevent the component from reaching the higher temperature T2. As the component experiences further thermal cycles, although not to the original higher temperature T2, further additional cooling is applied.

Figure 4:
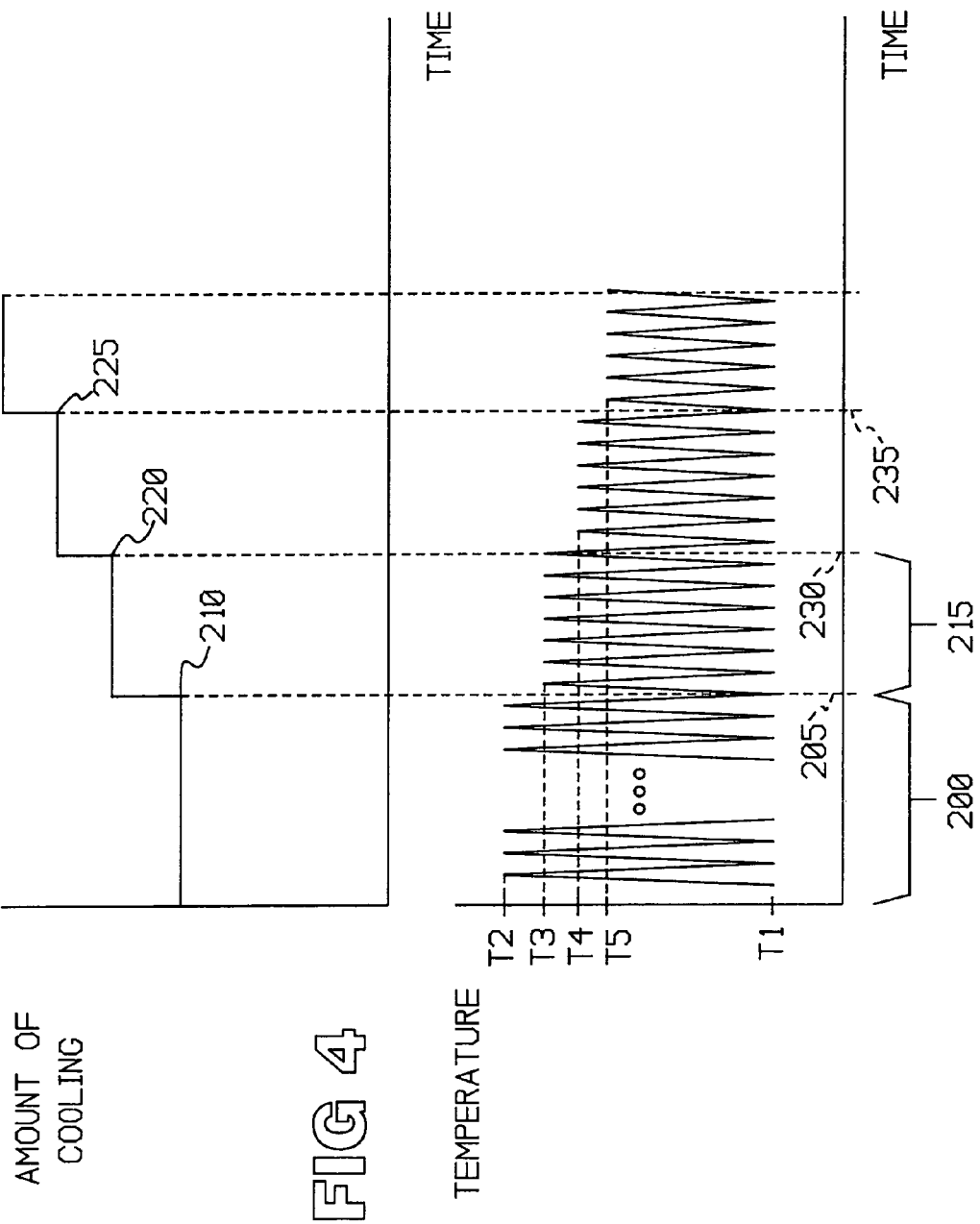
FIG. 4 is a generalized flow chart, in graphical form, illustrating processes implemented by one form of the invention.

FIG. 4 is a generalized graphical flow chart indicating one mode of operation of the invention. During time interval 200, the engine operates in the usual manner, and provides a standard amount of cooling. Thus, at this time, no additional cooling load is placed on the engine, so that no penalties on thrust or specific fuel consumption are incurred.

At time 205, a determination is made, as by sensing exhaust gas temperature using the control 50 of FIG. 1 or otherwise, that the component in question has reached a first threshold of thermal cycling.

In response, the control 50 in FIG. 1, or other apparatus, increases cooling of the component. The cooling can be increased by increasing a compressor bleed. Such increases are known in the art. The component in question can take the form of a turbine blade, a turbine shroud, or any component generally subject to thermal cycling.

The increase in cooling is indicated by the inflection point 210 in FIG. 4. After the increase, the component then experiences the thermal excursions generally indicated as 215. The higher temperature T3 to which the component is subject has been reduced.

This approach may be repeated, as indicated by inflection points 220, 225, and so on. That is, after a second threshold of cycles has been reached, as at point 230, cooling may be further increased, as indicated by inflection point 220. The component experiences thermal excursions between T1 and T4.

Again, after a third threshold has been reached, as at point 235, cooling may be further increased, as indicated by inflection point 225. The component experiences thermal excursions between T1 and T5, and so on.

In the example just given, the increase in cooling was prompted by attainment of a given number of thermal cycles by the component in question. Other conditions can be used to initiate the increase in cooling, such as (1) attainment of a given number of thermal cycles by another related component, (2) attainment of a given number of engine take-off and landing cycles, (3) attainment of a given number of peak temperatures by the component, (4) attainment of a given number of hours of engine operation, or (5) other conditions. The generalized criterion which initiates the increased cooling is whether the component, or engine, has reached a predetermined degree of deterioration, as that term is known in the art.

FIG. 5 is similar to FIG. 4, but illustrates another mode of temperature variation which may occur. During time period 250, the temperature of a component initially experiences an upward excursion from a base temperature T10. However, that base temperature increases, as indicated by envelope 253.

At time 265, the peak excursion reaches temperature T12, which is near or at a limit as indicated, the amount of cooling is increased. This causes the temperature excursions to follow the pattern shown in time period 255.

One feature of the invention is that compensating actions are taken which tend to maintain compressor stall margin at a constant value. For example, the increase in scheduled fuel flow, such as that indicated by the increase in schedule 125 in FIG. 2, can decrease compressor stall margin. The increase in compressor bleed which is subsequently taken, by itself, tends to increase compressor stall margin. However, when coupled with the increase in scheduled fuel flow, the increase in compressor stall margin reduces the decrease in stall margin caused by the increase in scheduled fuel flow.

Thus, the two actions have opposite effects, and tend to compensate each other, as respects compressor stall margin.

Numerous substitutions and modifications can be undertaken without departing from the true spirit and scope of the invention. What is desired to be secured by Letters Patent is the invention as defined in the following claims.

What is claimed is:

1. Method of operating a gas turbine engine having a turbine blade which requires cooling, comprising:
   a) delivering cooling air to the turbine blade;
   b) determining whether thermal history of the turbine blade has reached a limit indicating that the turbine blade should be replaced and, if so,
   c) increasing cooling of the turbine blade.

2. Method of operating a gas turbine engine having a component which requires cooling, comprising:
   a) delivering cooling air to the component;
   b) determining whether thermal history of the component has reached a limit indicating that the component should be replaced and, if so,
   c) increasing cooling of the component;
   d) demanding a predetermined type of acceleration in which fuel flow is scheduled according to engine parameters;
   e) ascertaining whether rate of acceleration meets a target and, if not,
   f) increasing scheduled fuel flow.

3. Method according to claim 2, wherein the increasing of scheduled fuel flow causes a decrease in compressor stall margin, and further comprising
   g) taking actions which increase compressor stall margin if the acceleration fails to meet the target.

4. Method according to claim 3, wherein compressor stall margin is increased by increasing compressor bleed.

5. Method of operating a gas turbine engine having a component which requires cooling, comprising:
   a) delivering cooling air to the component;
   b) determining whether a predetermined degree of deterioration of the engine has occurred and, if so;
   c) increasing cooling of the component,
wherein the process of determining whether deterioration has occurred is based on one, or more, sensor outputs which report engine operating parameters and wherein one sensor output reports exhaust gas temperature.

6. Method of operating a gas turbine engine having a component which requires cooling, comprising:
   a) delivering cooling air to the component;
   b) determining whether a predetermined degree of deterioration of the engine has occurred and, if so;
   c) increasing cooling of the component,
wherein the process of determining whether deterioration has occurred is based on one, or more, sensor outputs which report engine operating parameters and wherein the sensor outputs report rotor speeds, pressures, and temperatures.

* * * * *